United States Patent
Yim et al.

(10) Patent No.: US 10,425,526 B2
(45) Date of Patent: Sep. 24, 2019

(54) MOBILE TERMINAL AND METHOD FOR CONTROLLING THE SAME

(71) Applicant: LG ELECTRONICS INC., Seoul (KR)

(72) Inventors: Soyeon Yim, Seoul (KR); Jinhee Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/118,969

(22) Filed: Aug. 31, 2018

(65) Prior Publication Data

US 2019/0268462 A1    Aug. 29, 2019

(30) Foreign Application Priority Data

Feb. 26, 2018  (KR) .................. 10-2018-0023142

(51) Int. Cl.
| | |
|---|---|
| *H04M 1/00* | (2006.01) |
| *H04M 1/725* | (2006.01) |
| *H04M 1/02* | (2006.01) |
| *H04M 1/656* | (2006.01) |
| *G06F 3/0488* | (2013.01) |
| *H04M 1/60* | (2006.01) |

(52) U.S. Cl.
CPC .... *H04M 1/72569* (2013.01); *G06F 3/04886* (2013.01); *H04M 1/006* (2013.01); *H04M 1/026* (2013.01); *H04M 1/6041* (2013.01); *H04M 1/656* (2013.01); *H04M 2250/12* (2013.01)

(58) Field of Classification Search
CPC ............. H04M 1/72569; H04M 1/006; H04M 1/6041; H04M 1/656; H04M 2250/12; H04M 1/72519; H04M 1/72522; G06F 3/04886
USPC .................................. 455/575.1, 550.1, 418
See application file for complete search history.

(56) References Cited

U.S. PATENT DOCUMENTS

| | | | |
|---|---|---|---|
| 2009/0143106 A1* | 6/2009 | Meitzler | H04M 1/72527 455/566 |
| 2010/0007618 A1* | 1/2010 | Park | G06F 1/1626 345/173 |
| 2010/0181988 A1* | 7/2010 | Hong | G06F 1/1626 323/318 |
| 2013/0169067 A1* | 7/2013 | Rothkopf | G06F 1/1626 307/119 |
| 2013/0335319 A1* | 12/2013 | Balasundaram | G06F 3/0488 345/156 |
| 2018/0124255 A1* | 5/2018 | Kawamura | G06F 3/01 |
| 2018/0126219 A1* | 5/2018 | Parvaneh | A61B 5/1125 |
| 2018/0220220 A1* | 8/2018 | Eim | H04R 1/1016 |
| 2018/0364763 A1* | 12/2018 | Shim | G06F 1/1656 |

* cited by examiner

*Primary Examiner* — Danh C Le
(74) *Attorney, Agent, or Firm* — Birch, Stewart, Kolasch & Birch, LLP

(57) ABSTRACT

A mobile terminal including a main body; a wireless communication unit configured to transmit and receive a call signal and a voice signal to and from an external terminal; a grip sensor disposed on a side surface of the main body and configured to sense an external force applied to the side surface; and a controller configured to execute a call function with an external terminal, and execute a function related to the call function when a grip input is sensed through the grip sensor during the execution of the call function.

20 Claims, 17 Drawing Sheets

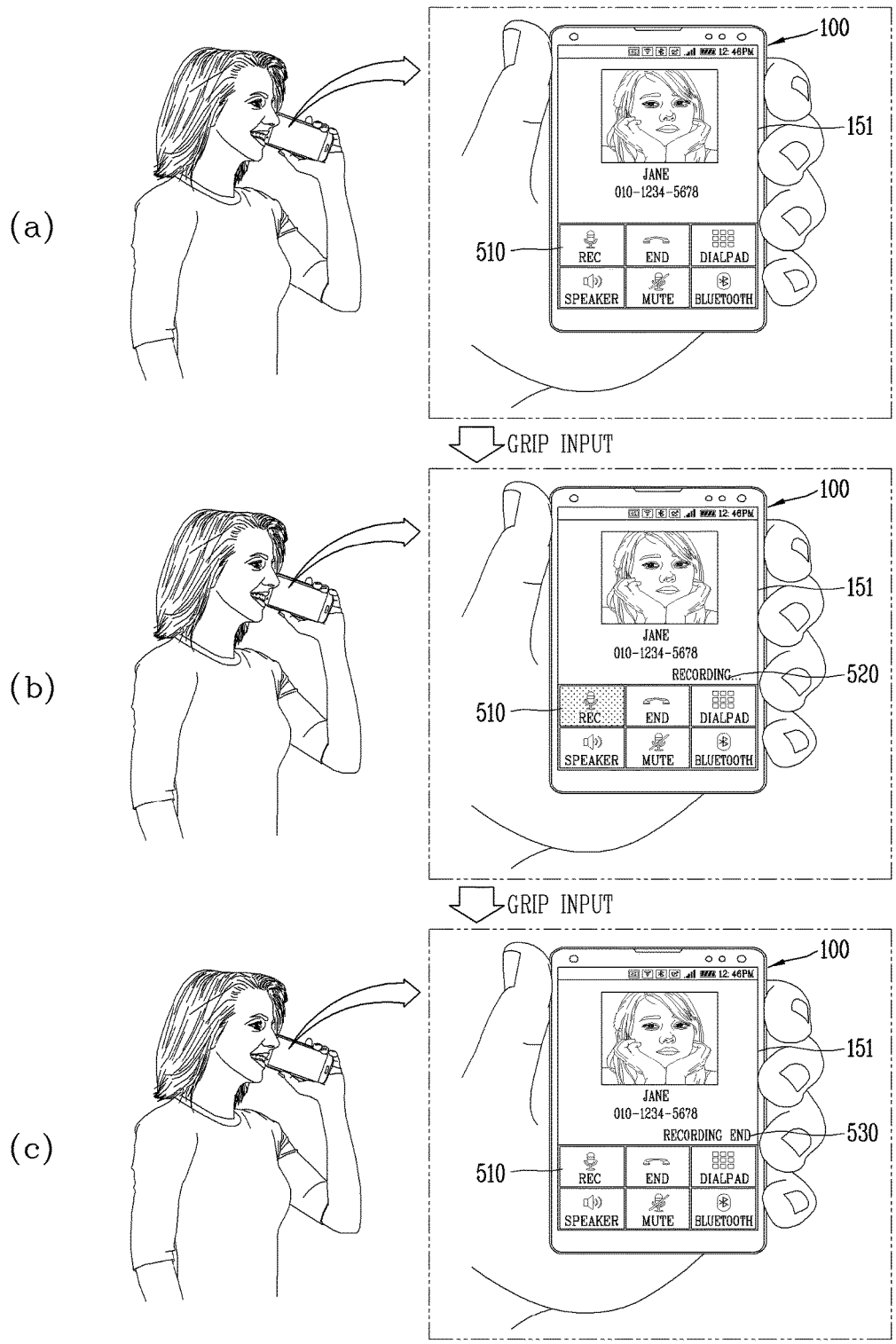

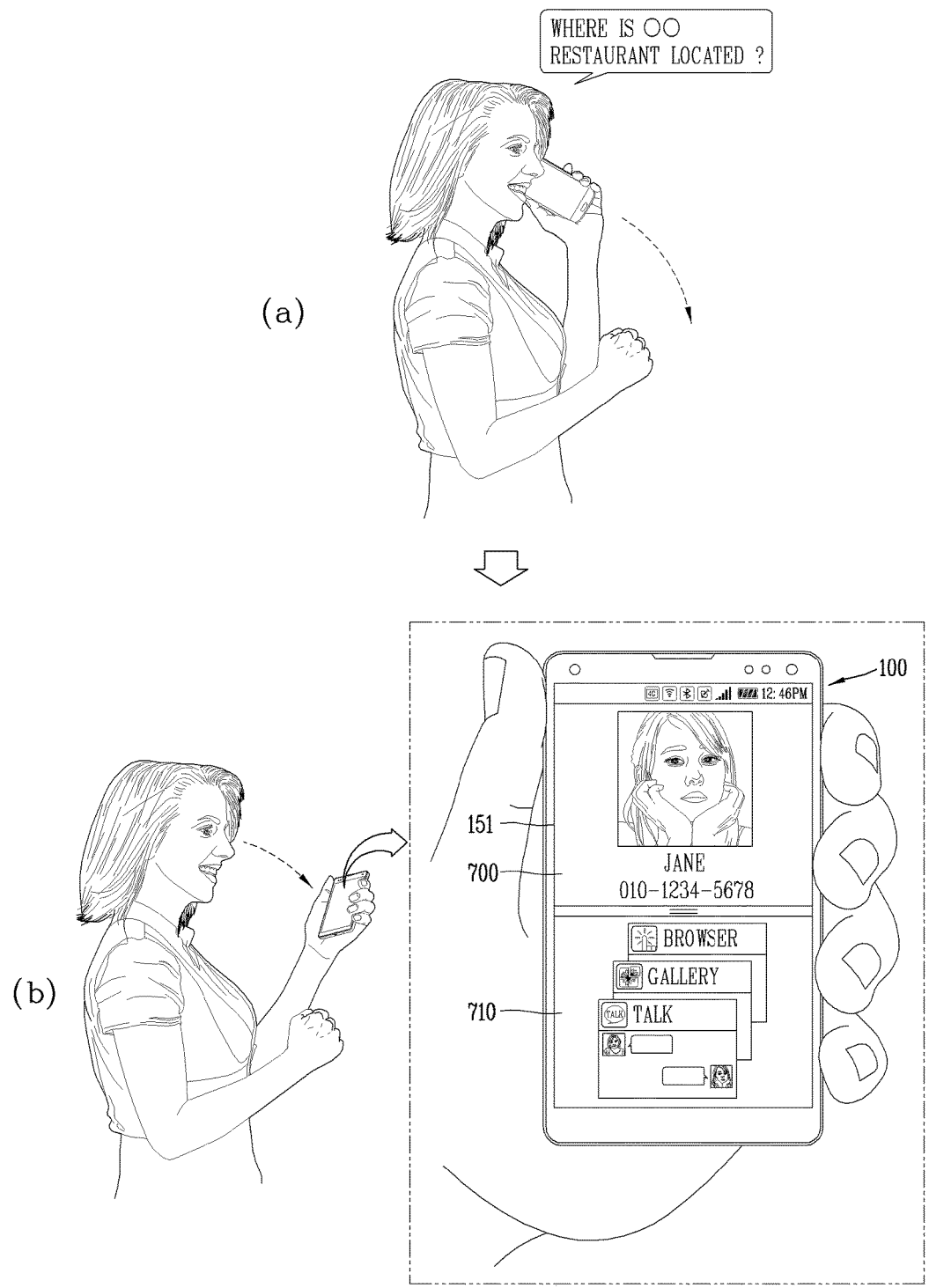

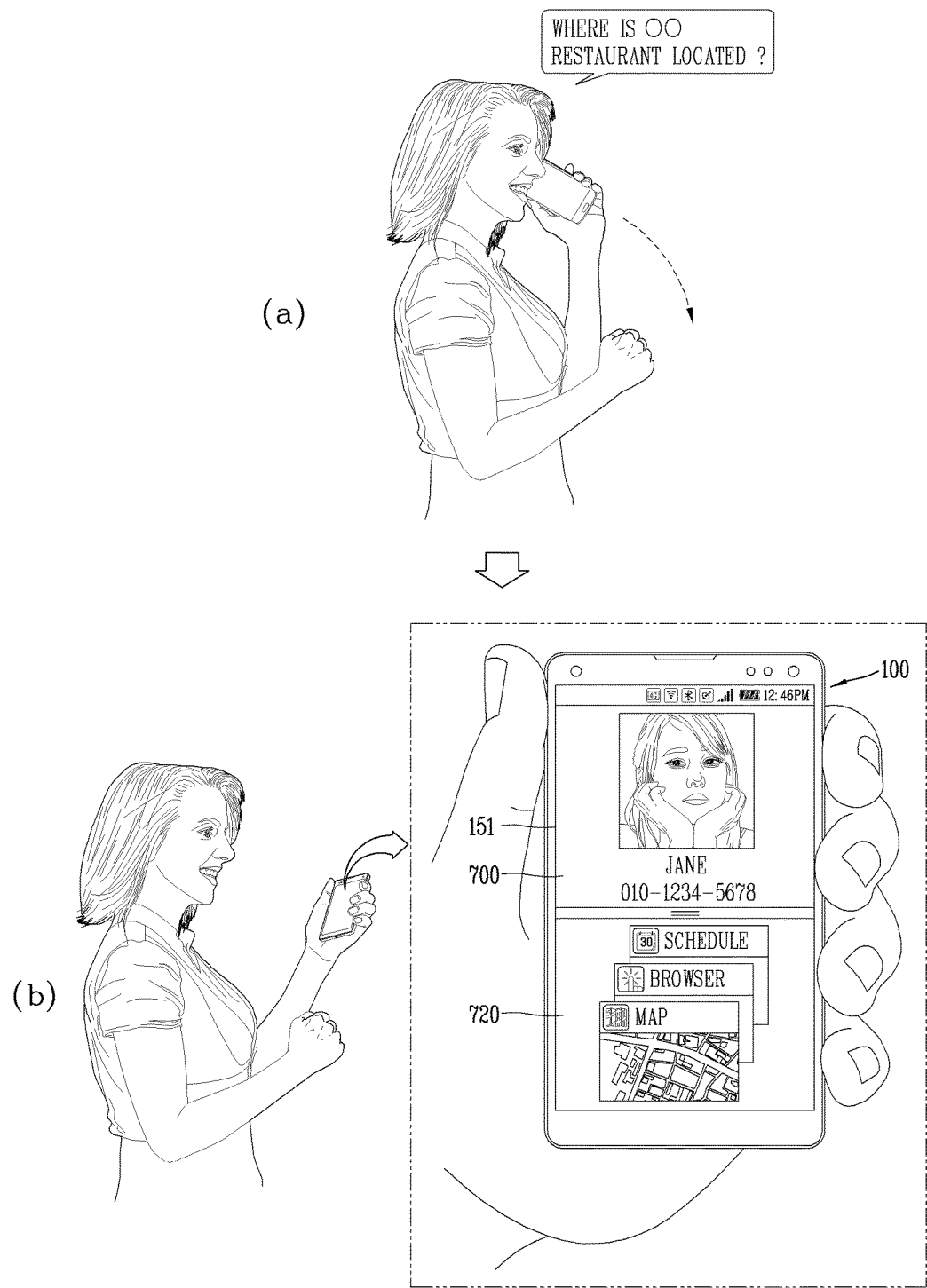

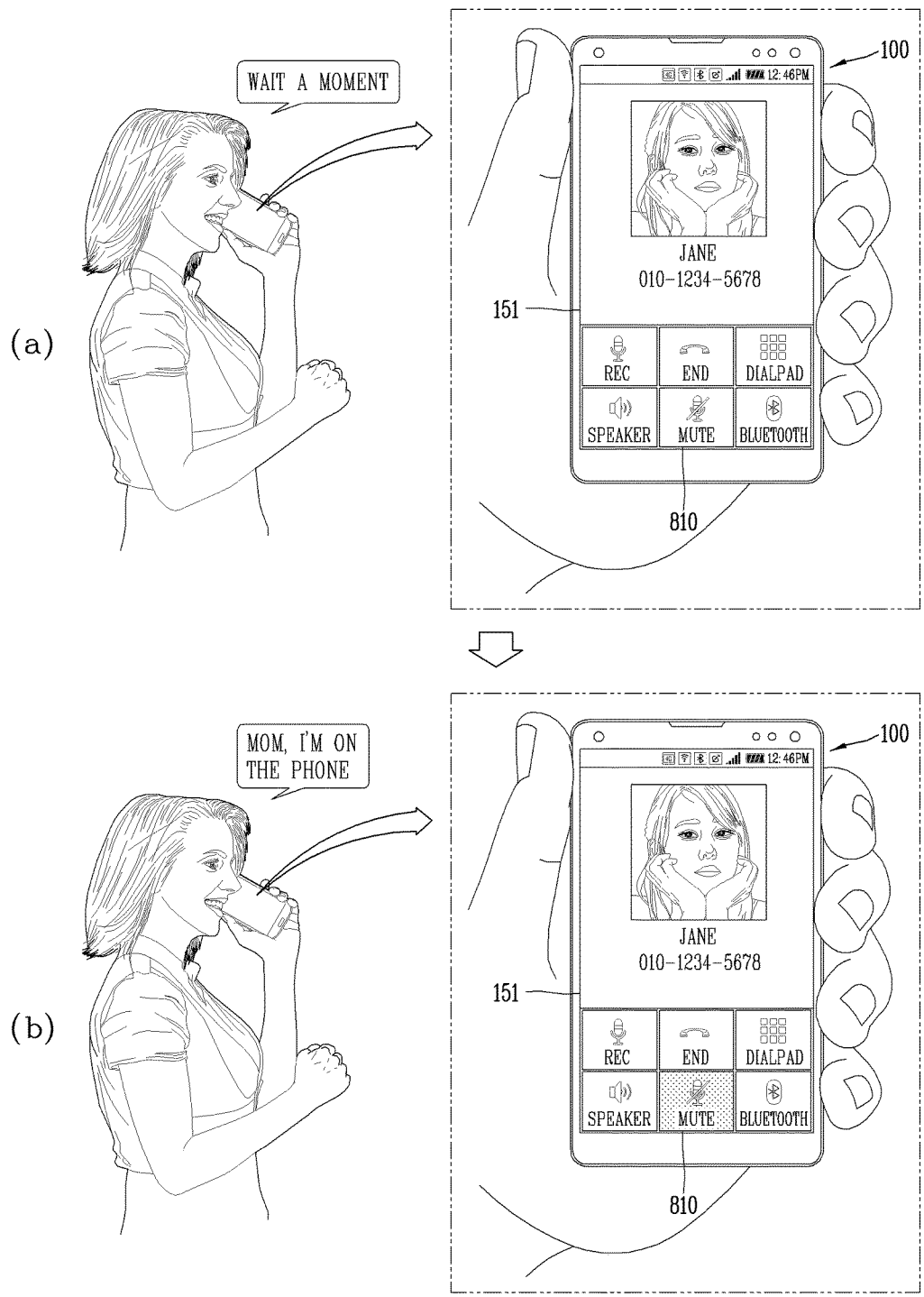

FIG. 9A
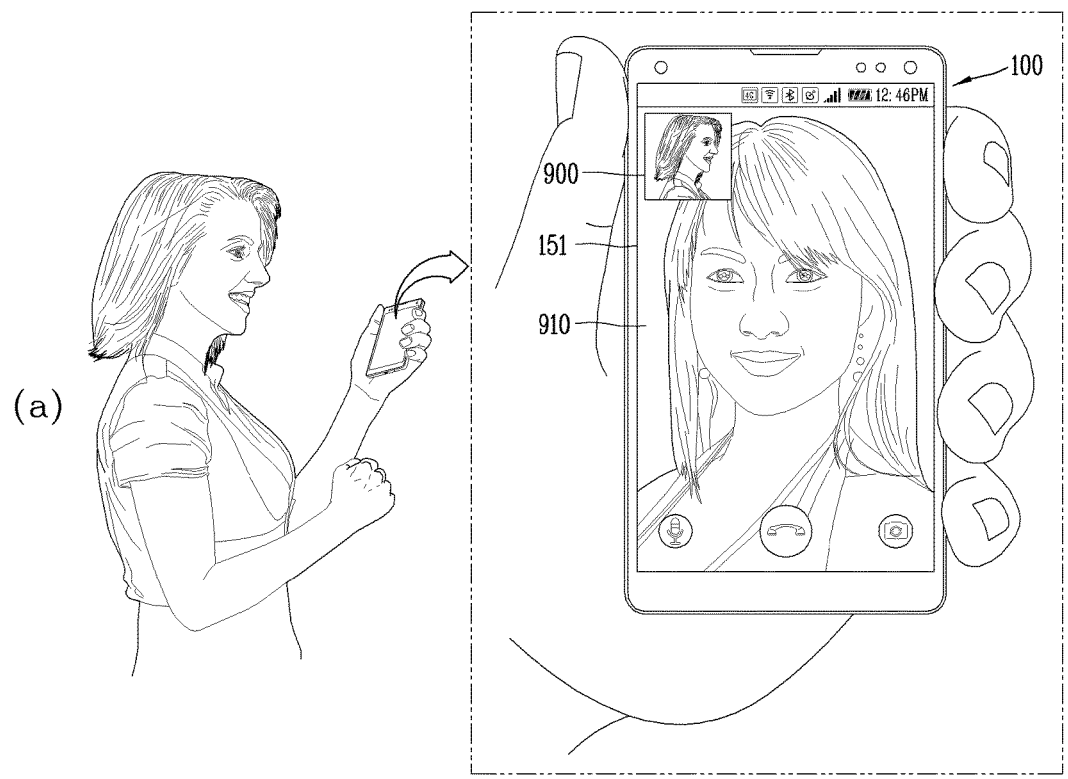
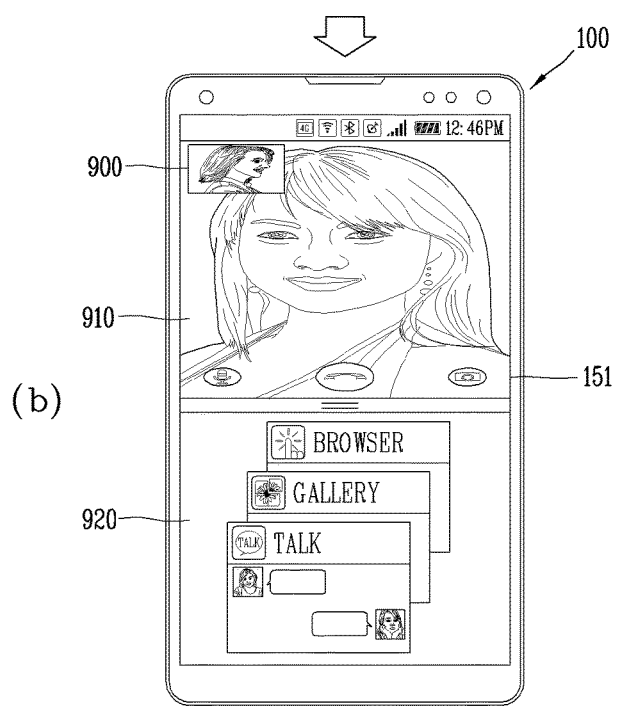

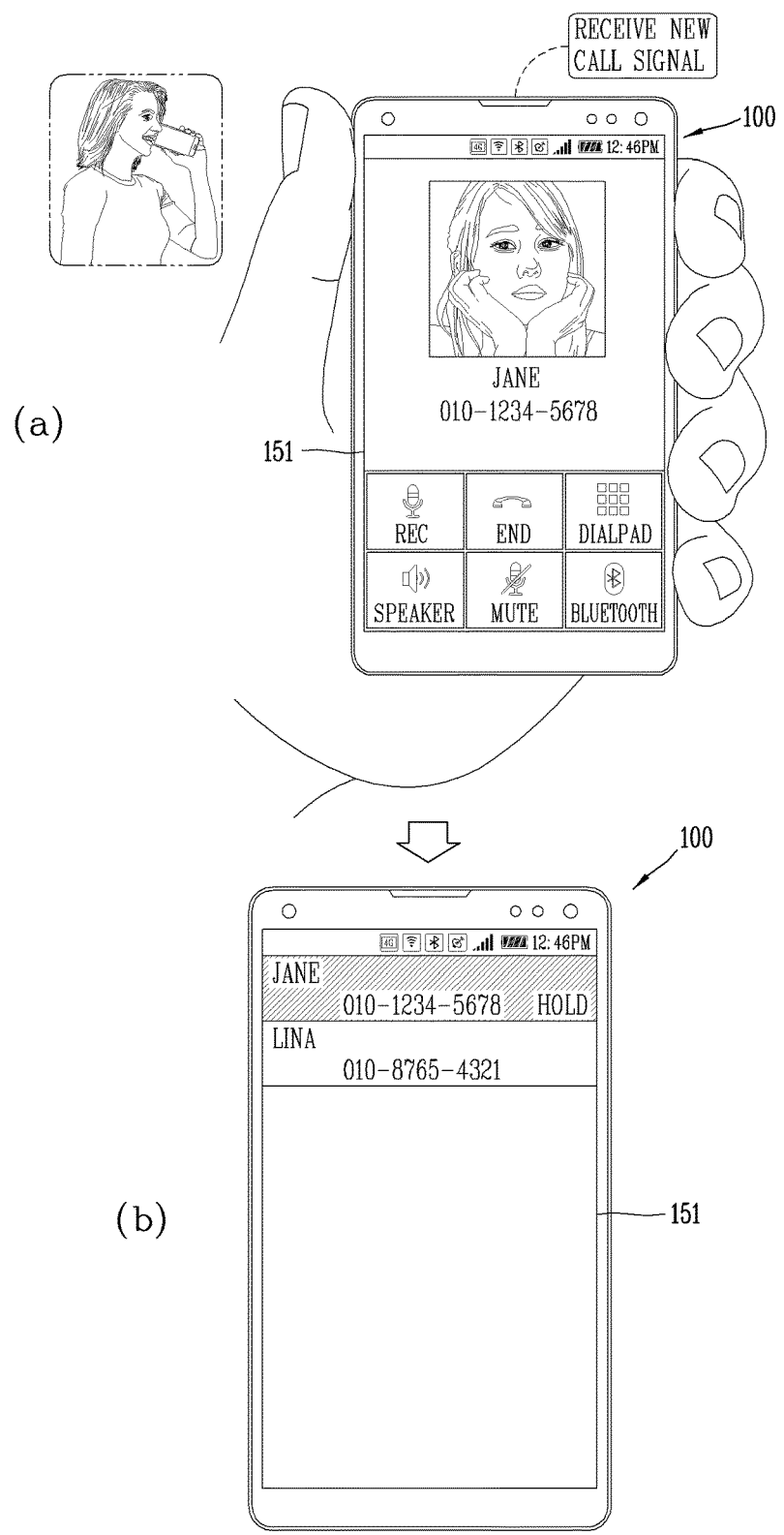

FIG. 11
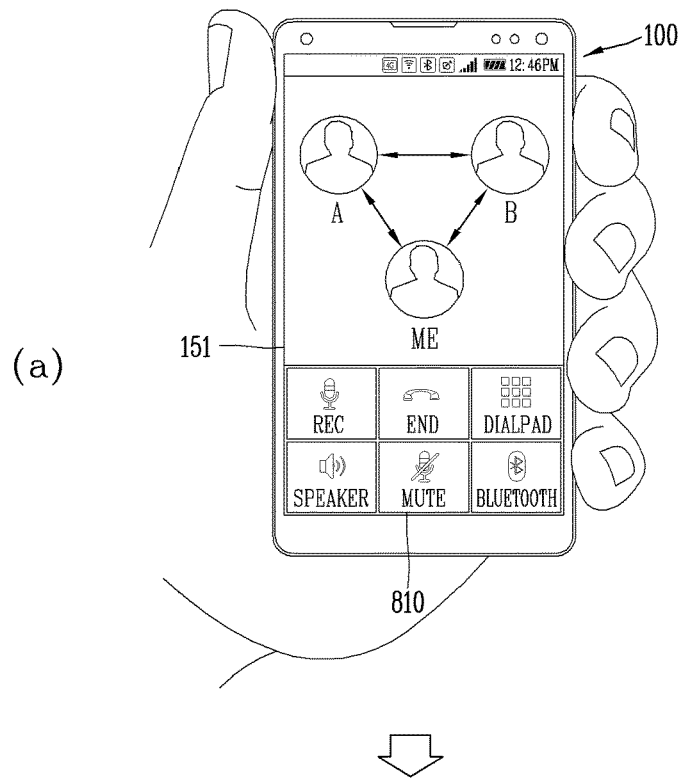
(a)
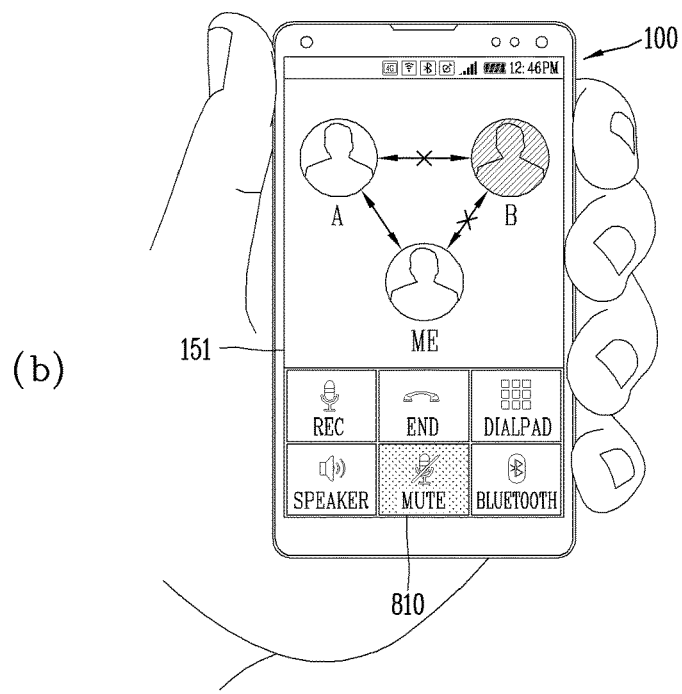
(b)

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2018-0023142, filed on Feb. 26, 2018, the contents of which are incorporated by reference herein in their entirety.

BACKGROUND OF THE INVENTION

1. Field of the Invention

The present disclosure relates to a mobile terminal capable of sensing an operation of gripping the terminal.

2. Description of the Related Art

Terminals may be divided into mobile/portable terminals and stationary terminals. Furthermore, mobile terminals may be divided into handheld terminals and vehicle mounted terminals according to whether or not it can be directly carried by a user.

The functions of mobile terminals have been diversified. For example, the functions may include data and voice communication, photographing and video shooting through a camera, voice recording, playing a music file through a speaker system, and displaying an image or video on a display unit. Some terminals further include an electronic game play function or perform a multimedia player function. In particular, in recent years, mobile terminals may receive multicast signals that provide visual content such as broadcast, video or television programs.

As it becomes multifunctional, for example, such a terminal can capture still images or moving images, play music or video files, play games, receive broadcast and the like, so as to be implemented as an integrated multimedia player. In order to support and enhance the functions of the terminal, the improvement of structural or software elements of the terminal may be taken into consideration.

In recent years, a terminal mounted with a grip sensor for sensing a user input applied to a side surface of a terminal body in order to simplify an external appearance of the terminal and control various functions has been released. The grip sensor is a sensor that senses a pressure applied when a user holds the terminal. As a new type of user input using a grip sensor is available, needs for a new type of user experience for controlling the terminal in a new manner in the market have been increased.

SUMMARY OF THE INVENTION

An object of the present disclosure is to provide a variety of user interfaces using a user input applied through a grip sensor.

According to the present disclosure, there is disclosed a mobile terminal, including a main body, a wireless communication unit formed to transmit and receive a call signal and a voice signal to and from an external terminal, a grip sensor disposed on a side surface of the main body to sense an external force applied to the side surface, and a controller configured to execute a call function for transmitting and receiving a voice signal to and from an external terminal based on a call signal received from an external terminal or transmitted to an external terminal, and execute a function related to the call function when a grip input is sensed through the grip sensor during the execution of the call function.

In a control method of a mobile terminal according to another embodiment of the present disclosure, the control method may include executing a call function for transmitting and receiving a call signal to and from an external terminal, sensing a user's ear adjacent to a main body through a proximity sensor, sensing a grip input through a grip sensor formed to sense an external force applied to a side surface of the main body while the user's ear adjacent to the main body is sensed, and executing a recording function of recording a voice signal related to the call function in response to the grip input.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a conceptual view illustrating a method of executing a recording function during a call;

FIGS. 7A and 7B are conceptual views illustrating a method of executing a multi-tasking function during a call;

FIG. 8 is a conceptual view illustrating a method of executing a mute function during a call;

FIGS. 9A and 9B are conceptual views illustrating a method of executing a multi-tasking function or a screen capture function during a video call;

FIG. 10 is a conceptual view illustrating a state in which a call switching function during a call is executed; and FIG. 11 is a conceptual view illustrating a method of executing a group call function.

DETAILED DESCRIPTION OF THE INVENTION

Figure 1A:
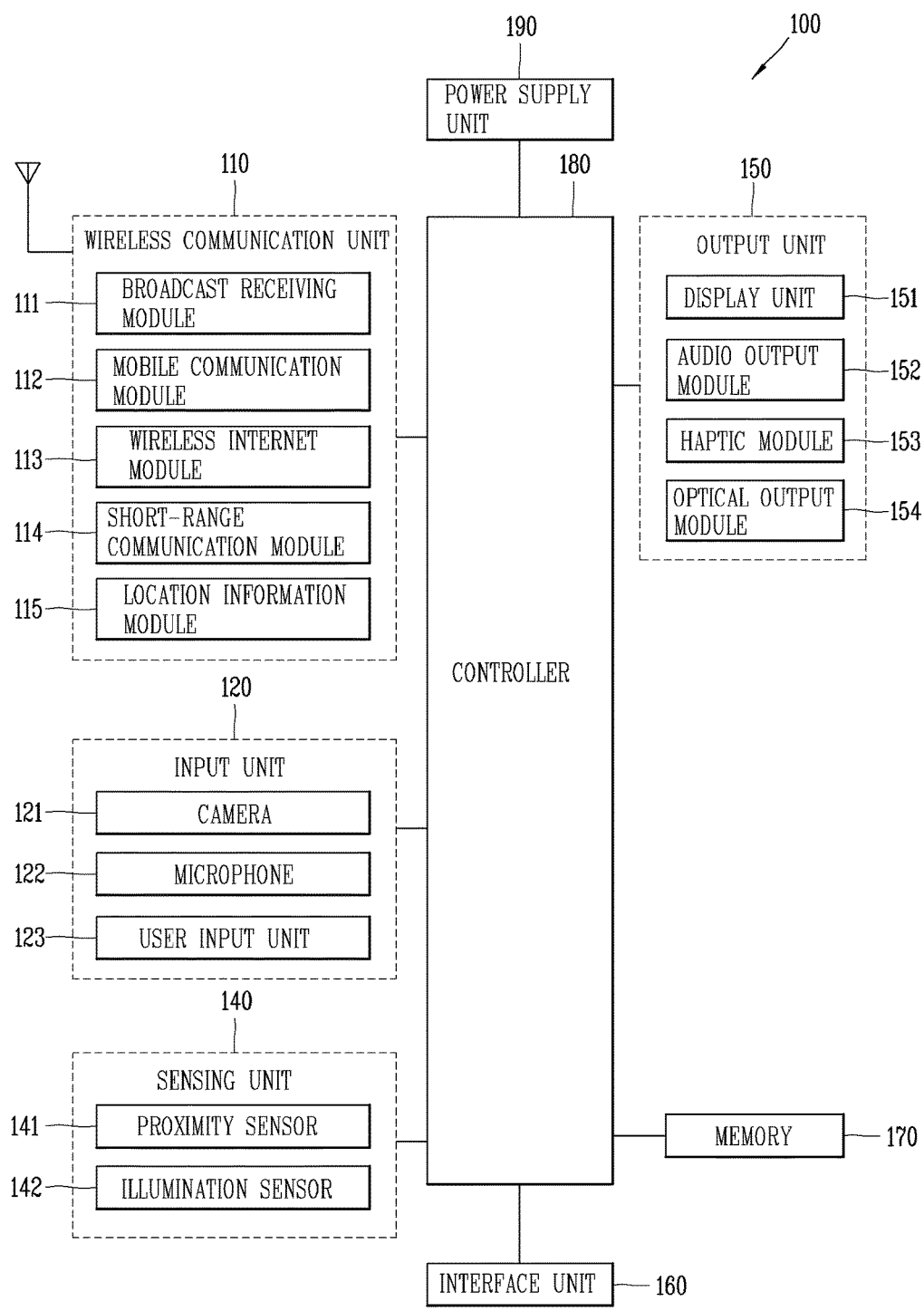
FIG. 1A is a block diagram illustrating a mobile terminal according to the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. The accompanying drawings are used to help easily understand the technical idea of the present disclosure and it should be understood that the idea of the present disclosure is not limited by the accompanying drawings.

Although the terms first, second, etc. may be used herein to describe various elements, these elements should not be limited by these terms. These terms are generally only used to distinguish one element from another. When an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context. Terms "include" or "has" used herein should be understood that they are intended to indicate an existence of several components or several steps, disclosed in the specification, and it may also be understood that part of the components or steps may not be included or additional components or steps may further be included.

Portable electronic devices described herein may include cellular phones, smart phones, laptop computers, digital broadcasting terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like. However, it may be easily understood by those skilled in the art that the configuration according to the exemplary embodiments of this specification can also be applied to stationary terminals such as digital TV, desktop computers and the like, excluding a case of being applicable only to the electronic devices.

Figure 1B:
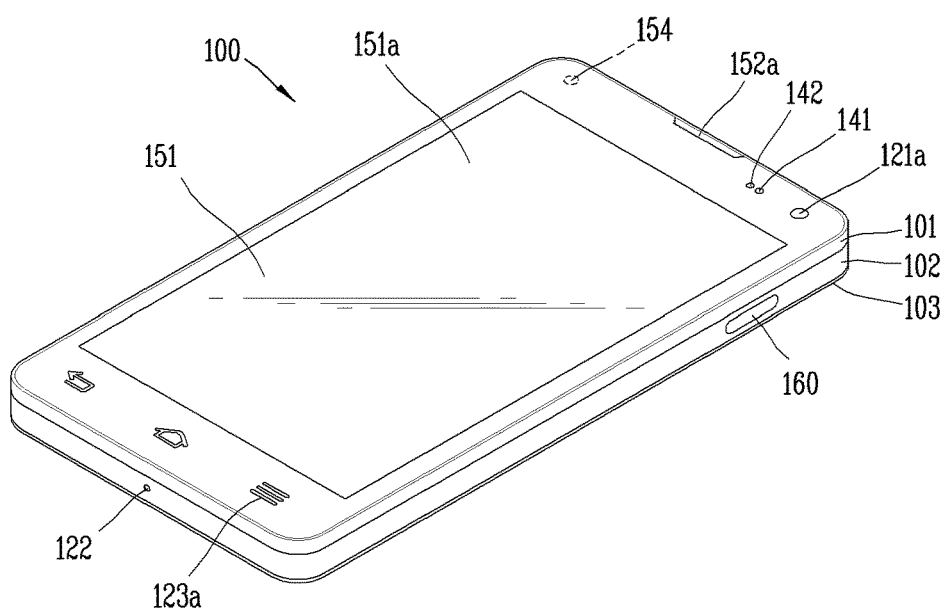
FIGS. 1B and 1C are conceptual views illustrating an example in which a mobile terminal according to the present disclosure is seen from different directions.
Figure 1C:
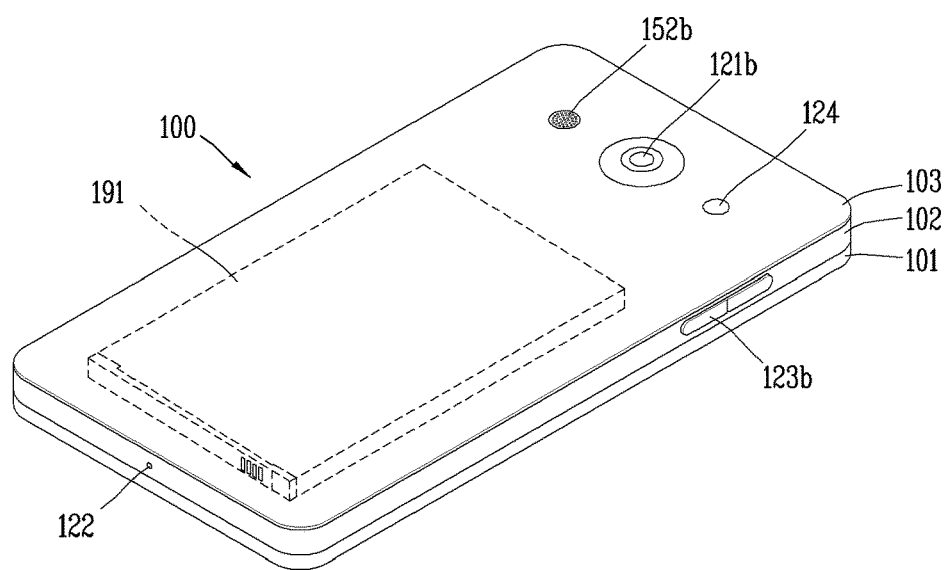

Referring to FIGS. 1A through 1C, FIG. 1A is a block diagram illustrating explaining a mobile terminal associated with the present disclosure, and FIGS. 1B and 1C are conceptual views illustrating an example in which the mobile terminal associated with the present disclosure is seen from different directions.

The mobile terminal 100 may include components, such as a wireless communication unit 110, an input unit 120, a sensing unit 140, an output unit 150, an interface unit 160, a memory 170, a controller 180, a power supply unit 190 and the like. Implementing all of the illustrated components is not a requirement, and that greater or fewer components may alternatively be implemented. Referring now to FIG. 1A, the mobile terminal 100 is shown having wireless communication unit 110 configured with several commonly implemented components.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules for connecting the mobile terminal 100 to one or more networks.

The wireless communication unit 110 may include at least one of a broadcast receiving module 111, a mobile communication module 112, a wireless Internet module 113, a short-range communication module 114, a location information module 115 and the like. The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output module 152, a haptic module 153, an optical output unit 154 and the like. The display unit 151 may have an inter-layered structure or an integrated structure with a touch sensor in order to facilitate a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 can execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). Further, the application programs may be stored in the memory 170, installed in the mobile terminal 100, and executed by the controller 180 to perform an operation (or a function) of the mobile terminal 100.

The controller 180 typically controls an overall operation of the mobile terminal 100 in addition to the operations associated with the application programs. The controller 180 can provide or process information or functions appropriate for a user by processing signals, data, information and the like, which are input or output by the aforementioned components, or activating the application programs stored in the memory 170.

Furthermore, the controller 180 can control at least part of the components illustrated in FIG. 1A, in order to drive the application programs stored in the memory 170. In addition, the controller 180 can drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration. First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the portable electronic device 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.) The wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies. Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), which can exchange data with the mobile terminal 100 (or to link data with the mobile terminal 100). The short-range communication module 114 can sense (recognize) a wearable device, which can communicate with the mobile terminal), near the mobile terminal 100. In addition, when the sensed wearable device is a device which is authenticated to communicate with the mobile terminal 100 according to the present disclosure, the controller 180 can transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a WiFi module, or both. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Then, the input unit 120 is configured to provide an video information (or signal), audio information (or signal), data or an input of information entered by a user, and the mobile terminal 100 may include one or a plurality of cameras 121 to enter video information. The camera 121 processes an image frame, such as still picture or video, acquired by an image sensor in a video phone call or image capturing mode. The processed image frames may be displayed on the display unit 151. Further, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). Further, the microphone 122 may include assorted noise removing algorithms to remove noise generated in the course of receiving the external audio signal.

The user input unit 123 may receive information input by a user. When information is input through the user input unit 123, the controller 180 can control an operation of the mobile terminal 100 to correspond to the input information. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input means may be a virtual key, a soft key or a visual key, which is displayed on a touch screen through software processing, or a touch key which is disposed on a portion except for the touch screen. Further, the virtual key or the visual key may be displayable on the touch screen in various shapes, for example, graphic, text, icon, video or a combination thereof.

Further, the sensing unit 140 can sense at least one of internal information of the mobile terminal, surrounding environment information of the mobile terminal and user information, and generate a sensing signal corresponding to it. The controller 180 can control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer to the touch screen by changes of an electromagnetic field, which is responsive to an approach of an object with conductivity. In this instance, the touch screen (touch sensor) may also be categorized as a proximity sensor.

Further, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 can sense proximity touch, and proximity touch patterns (e.g., distance, direction, speed, time, position, moving status, etc.). Further, the controller 180 can process data (or information) corresponding to the proximity touches and the proximity touch patterns sensed by the proximity sensor 141, and output visual information corresponding to the process data on the touch screen. In addition, the controller 180 can control the mobile terminal 100 to execute different operations or process different data (or information) according to whether a touch with respect to the same point on the touch screen is either a proximity touch or a contact touch.

A touch sensor can sense a touch (or touch input) applied onto the touch screen (or the display unit 151) using at least one of various types of touch methods, such as a resistive type, a capacitive type, an infrared type, a magnetic field type, and the like. As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180 or the controller 180 itself.

Further, the controller 180 can execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

In addition, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like. An ultrasonic sensor may be configured to recognize position information relating to a sensing object by using ultrasonic waves. On the other hands, the controller 180 can calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor (or image sensor) and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output module 152 may also provide audible output signals associated with a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user can feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. Two or more haptic modules 153 may be provided according to the particular configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like. A signal output by the optical output module 154 may be implemented so the mobile terminal emits monochromatic light or light with a plurality of colors. The signal output may be ended as the mobile terminal senses a user's event checking.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

Further, the identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identification device") may take the form of a smart card. Accordingly, the identifying device may be connected with the electronic device 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power input from the cradle may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 can typically control the general operations of the mobile terminal 100. For example, the controller 180 can set or release a locked state for restricting a user from inputting a control command with respect to applications when a state of the mobile terminal meets a preset condition.

Furthermore, the controller 180 can also perform controlling and processing associated with voice calls, data communications, video calls, and the like, or perform pattern recognition processing to recognize a handwriting input or a picture drawing input performed on the touch screen as characters or images, respectively. In addition, the controller 180 can control one or combination of those components in order to implement various exemplary embodiment disclosed herein on the mobile terminal 100.

The power supply unit 190 may receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected. As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. The description in association with a specific type of mobile terminal or on a specific type of mobile terminal will be also typically applied to another type of mobile terminal.

The mobile terminal 100 may include a case (for example, a frame, a housing, a cover, etc.) constituting the appearance thereof. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. Further, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. Unlike the example which the plurality of cases form an inner space for accommodating such various components, the mobile terminal 100 may be configured such that one case forms the inner space. In this example, a mobile terminal 100 having a uni-body formed so synthetic resin or metal extends from a side surface to a rear surface may also be implemented.

Further, the mobile terminal 100 may include a waterproofing unit for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

However, the foregoing configuration may not be necessarily limited to the arrangement. The foregoing configuration may be excluded, substituted or disposed on another surface if necessary. For example, the first manipulation unit 123a may not be disposed on the front surface of the terminal body, and the second audio output module 152b may be disposed on the side surface other than the rear surface of the terminal body.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display. The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 can generate a control command corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

Thus, the display unit 151 may form a flexible touch screen along with the touch sensor, and in this instance, the touch screen may function as the user input unit 123 (refer to FIG. 1A). Therefore, the touch screen may replace at least some of the functions of the first manipulation unit 123a. The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the controller 180 can control the optical output unit 154 to end the output of light.

The first camera 121a may process video frames such as still or moving images acquired by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may employ any method if it is a tactile manner allowing the user to perform manipulation with a tactile feeling such as touch, push, scroll or the like. In addition, the first and second manipulation units 123a and 123b may also employ a method of allowing the user to perform manipulation without a tactile feeling through a proximity touch, a hovering touch, or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

Further, as another example of the user input unit 123, a rear input unit may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap with the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

Further, the mobile terminal 100 may include a fingerprint recognition sensor for recognizing a user's fingerprint, and the controller 180 can use fingerprint information sensed through the finger recognition sensor as an authentication means. The finger scan sensor may be installed in the display unit 151 or the user input unit 123. The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject. The second audio output module 152b may further be disposed on the terminal body. The second audio output module 152b may implement a stereo function in conjunction with the first audio output module 152a, and may be also used to implement a speakerphone mode during a call.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

Further, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may link with the display unit 151 to extend the function of the mobile terminal 100. Another example of the accessory may be a touch pen for assisting or extending a touch input onto a touch screen.

In recent years, a grip sensor is mounted on a mobile terminal to allow a user to enter a user input through gripping the terminal. Hereinafter, the structure and operation method of the grip sensor according to a sensing method of a grip will be described with reference to FIGS. 2A through 3C.

Figure 2A:
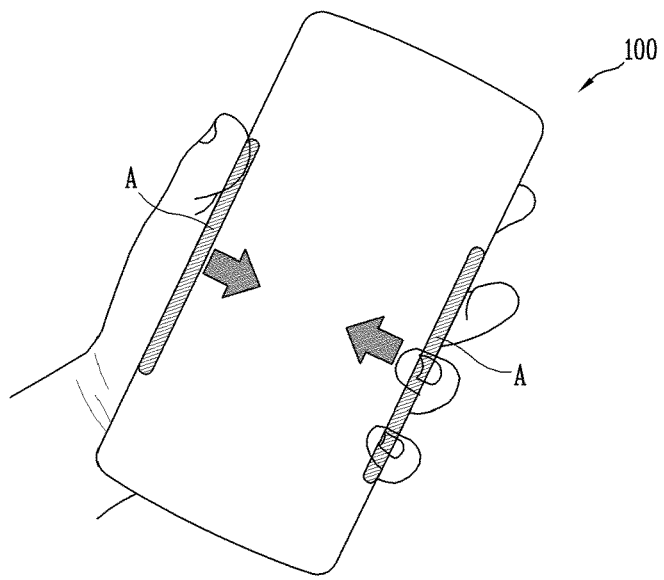
FIGS. 2A and 2B are conceptual views illustrating an implementation of a grip sensor mounted on a mobile terminal according to the present disclosure.
Figure 2B:
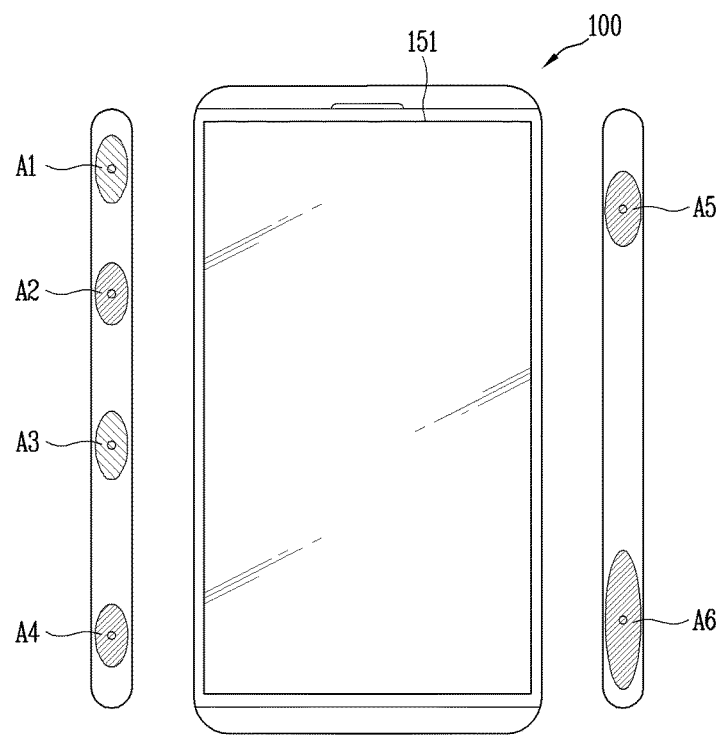

Next, FIGS. 2A and 2B are conceptual views illustrating an implementation of a grip sensor mounted on a mobile terminal according to the present disclosure. The grip sensor according to an embodiment of the present disclosure may be disposed on a side surface of the terminal body. A plurality of regions (A1, A2, A3, A4, A5, A6) may be respectively disposed on a side portion of the terminal body, and a plurality of grip sensors may be disposed in the plurality of regions (A).

Each of the grip sensors senses a pressure applied to at least one of the plurality of regions, and the controller 180 performs a function corresponding to each region based on the pressure sensed by the each of the grip sensors. An area sensed by each of the plurality of the grip sensors may be set differently, and a distance between the grip sensors may not be constant.

Figure 2C:
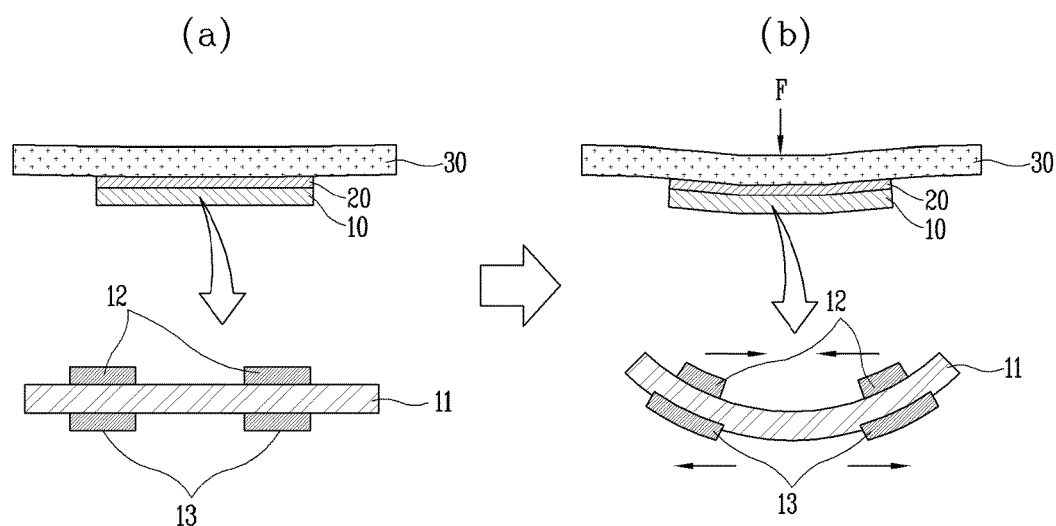
FIG. 2C is a conceptual view illustrating a grip sensor adhered to a substrate.

FIG. 2C is a conceptual view illustrating a grip sensor adhered to a substrate. The mobile terminal 100 of the present disclosure includes a grip sensor 10 disposed in a region forming a side surface of a main body of a front case 101 (see FIGS. 1A and 1B) constituting an external appearance and forming an inner space. The front case 101 may have a deformed structure to transmit an external force to the grip sensor 10.

The grip sensor 10 is adhered to an inner surface of the front case 101, and the front case 101 is deformed while one region is pressed by a pressure applied to a side surface of the main body. Accordingly, when one region of the front case 101 is pressed, the grip sensor 10 may be deformed to sense a pressure applied thereto due to a change of resistance value of a deformable member.

A substrate 30 of FIG. 2C may correspond to the front case 101 of an electronic device of the present disclosure. The grip sensor 10 is fixed on the substrate 30 by an adhesive member 20. The grip sensor 10 includes a base substrate 11 and first and second deformable members 12, 13 formed on both sides of the base substrate 11, respectively. The first and second deformable members 12, 13 may be disposed on the base substrate 11 to be spaced apart from each other when configured with a plurality of deformable members.

When a pressure (F) is applied on the substrate 30 to which the grip sensor 10 is adhered, the substrate 30 is deformed. When the substrate 30 is deformed in a direction in which the pressure (F) is applied thereto, the base substrate 11 is also bent in the same direction. The first and second deformable members 12, 13 formed on both sides of the base substrate 11 are deformed in directions opposite to each other. The first deformable member 12 is disposed on a concave surface of the deformed base substrate 11 to contract, and the second deformable member 13 is disposed on a convex surface of the deformed base substrate 11 to expand.

Accordingly, a resistance value of the first deformable member 12 of the grip sensor 10 decreases due to contraction, and a resistance value of the second deformable member 13 increases due to expansion. The controller 180 can acquire information on whether or not a pressure is applied thereto and a degree of pressure applied thereto and a direction in which the pressure is applied thereto by a change of an output value due to a change of resistance value of the first and second deformable members 12, 13.

Figure 3A:
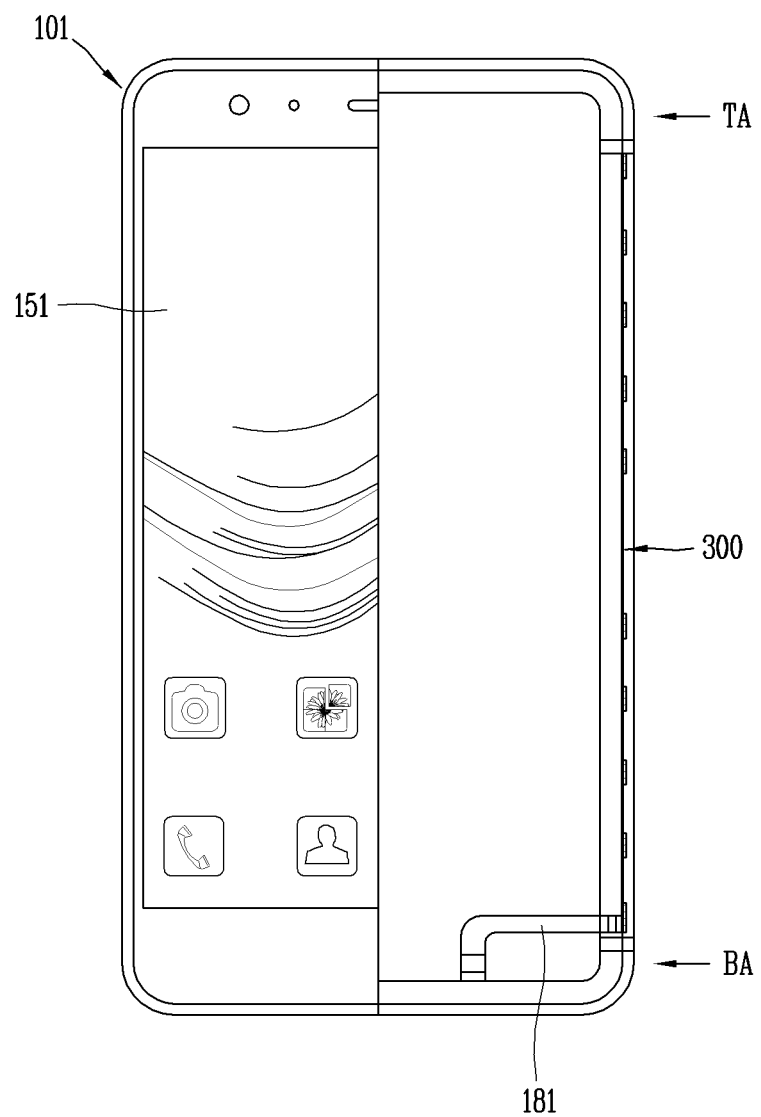
FIGS. 3A through 3C are conceptual views illustrating a grip sensor disposed on a side surface of the main body.
Figure 3B:
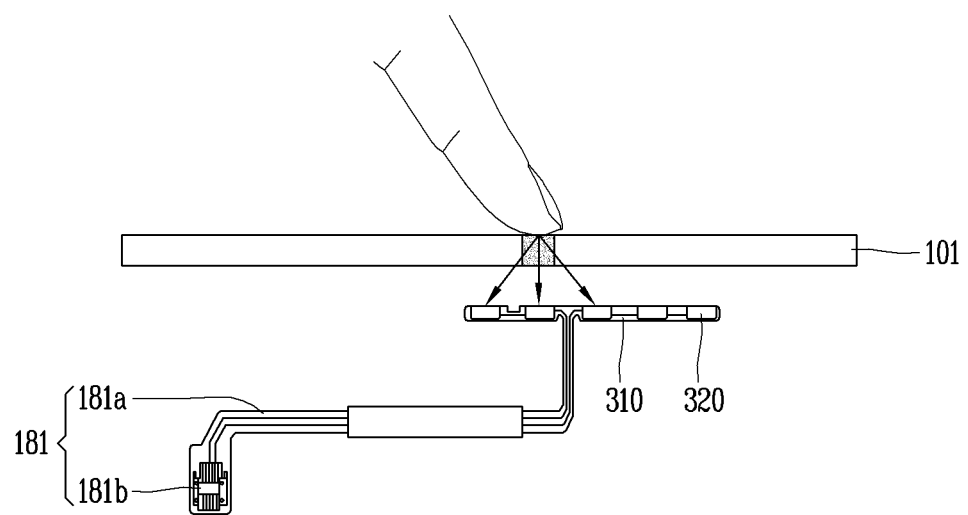
Figure 3C:
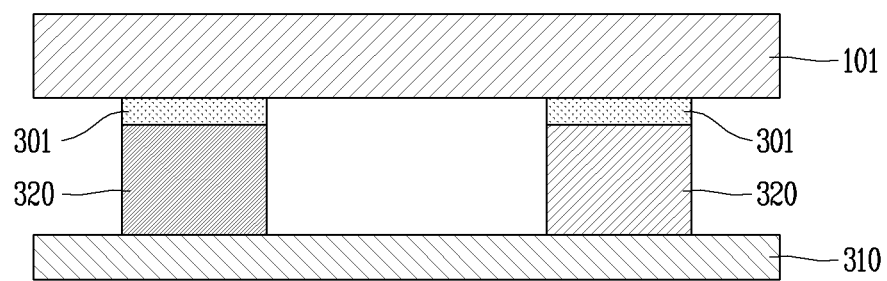

Next, FIGS. 3A through 3C are conceptual views illustrating a grip sensor disposed on a side surface of the main body. Referring to FIG. 3A, the grip sensor 300 is disposed on a side connecting an upper portion (TA) and a lower portion (BA) of the main body. The grip sensor 300 senses a touch input and a pressure by a user's grip, and the controller 180 forms a control command based on a touch and/or a pressure sensed by the grip sensor 300. In one example, the grip sensors 300 are formed on both sides facing each other.

The grip sensor 300 is extended in a length direction of the main body and one end thereof is electrically connected to a main circuit board by a flexible circuit board 181.

The grip sensor 300 includes a base 310 and a plurality of piezo sensors 320. The base 310 may correspond to a flexible circuit board extended in one direction. The plurality of piezo sensors 320 are disposed along one direction. The flexible circuit board 181 includes an extension portion 181a extended from the base 310 and a connection pad portion 181b electrically connected to the main circuit board.

The plurality of piezo sensors 320 are alternately implemented as a Tx portion and an Rx portion. When an AC high voltage at a high frequency is applied to the piezo sensor 320 (for example, about 700 kHz, about 250 Ma), the vibration of the piezo sensor 320 is generated. Furthermore, when a pressure is applied to the piezo sensor 320, an AC voltage is generated in proportion to the pressure. The controller 180 can sense the touch input by a change of a fine vibration pattern, and sense the pressure based on the generation of the AC voltage.

When a finger is touched, an ultrasonic pattern is output from the piezo sensor of the Tx portion, and a change of the ultrasonic pattern is sensed by the piezo sensor of the Rx portion. When a change of the ultrasonic pattern is detected, it is determined that a touch input is applied. When the ultrasonic pattern is output, fine vibration is generated.

Referring to FIG. 3C, a plurality of piezo sensors 320 are disposed on the base 310 at a specific distance from each other. An adhesive member 301 is formed on the plurality of piezo sensors 310 and adhered to an inner surface of the front case 101 of the electronic device 100. Accordingly, the grip sensor 300 can sense the touch input and the pressure by the user's grip holding the front case 101.

In the above, the grip sensor for sensing the user's grip has been described in the mobile terminal according to the present disclosure. In the following description, various embodiments applicable to both a grip sensor due to pressure sensing and a grip sensor due to ultrasonic sensing described above will be described.

Hereinafter, a method of executing a call-related function using the grip sensor while performing a call function will be described. In particular, FIG. 4 is a flowchart illustrating a method of executing a call-related function using a grip sensor while performing a call function in a mobile terminal according to the present disclosure.

Figure 4:
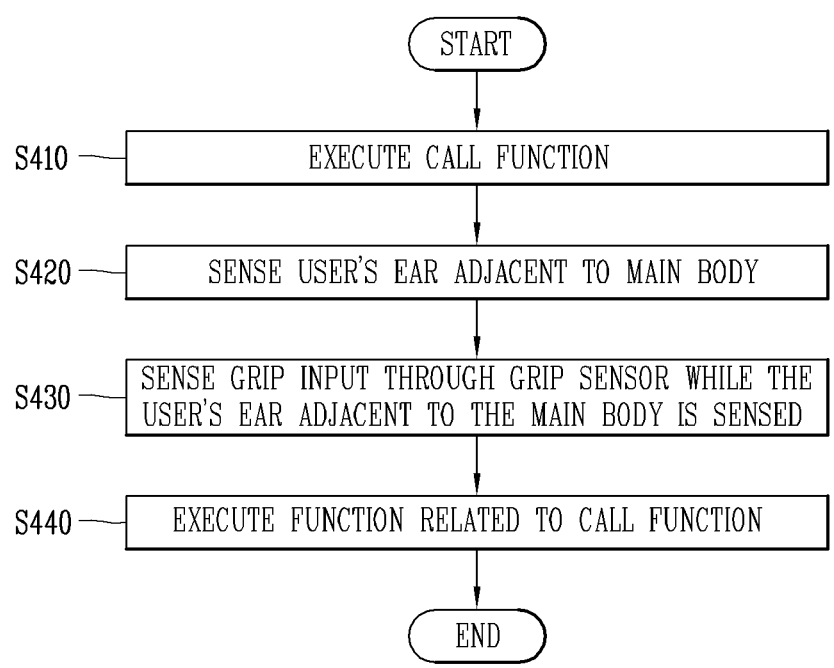
FIG. 4 is a flowchart illustrating a method of executing a call-related function using a grip sensor while performing a call function in a mobile terminal according to the present disclosure.

Referring to FIG. 4, the controller 180 of the mobile terminal according to the present disclosure can execute a call function (S410). The controller 180 of the mobile terminal according to the present disclosure may communicate with at least one external terminal to execute a call function when a call signal is received or a call signal is transmitted through the wireless communication unit. The calling function may be a function of connecting to an external server such as a cloud server to perform data communication. However, in the following description, for convenience of explanation, the communication function will be described, assuming that it is a function of allowing a user to communicate with the other party of the received or incoming call.

The mobile terminal is provided with a call application for performing a call function. The call application may be installed at the factory shipment of the mobile terminal, or may be downloaded directly from an application server (e.g., Google Play, etc.) and installed by the user.

The controller 180 can execute a call application to transmit a call signal to an external terminal, or automatically execute a call application to execute a call function when a call signal is received from an external terminal. In addition, when the call function is executed, the controller 180 can transmit and receive a voice signal to enable communication between a user of the mobile terminal and a user of the external terminal, which is a counterpart of the call function.

Further, when the call function is executed, the controller 180 can execute either one of a normal call mode or a speakerphone mode. The normal call mode is a mode in which the volume of the microphone and the speaker is controlled so that the user can make a call in a state where the user is adjacent (within a predetermined distance) to or in contact with the main body. The speakerphone mode is a mode in which the volume of the microphone and the speaker is controlled so that the user can make a call at a position distant from the main body by more than a predetermined distance.

The controller 180 can set the normal call mode to the default setting. Then, the controller 180 can switch from the normal call mode to the speakerphone mode according to a user request. Alternatively, the controller 180 can automatically switch between the normal call mode and the speakerphone mode according to whether the user's ear adjacent to the main body is sensed. Hereinafter, when the call function is executed, it will be described, assuming that the mobile terminal is being executed in a normal call mode unless otherwise noted.

The controller 180 can sense the user's ear adjacent to the main body in the normal call mode (S420). For example, the controller 180 can sense the user's ear adjacent to the main body through the sensor during the execution of the call function in the normal call mode. Such a sensor may include a proximity sensor 141, an image sensor, and the like. In other words, the controller 180 can determine that the user is in a state of performing a call while holding the mobile terminal close to his or her ear. On the contrary, when an ear adjacent to the main body is not sensed through the sensor, the controller 180 can determine that the user is performing a call in a state of being far away from the mobile terminal.

The controller 180 can sense a grip input through the grip sensor while the user's ear adjacent to the main body are sensed (S430). The grip sensor is a sensor for sensing an external force applied to a side surface of the main body, and the detailed description thereof will be substituted by the description of FIGS. 2 and 3.

The controller 180 can form a different control command based on at least one of a sensing position, a sensing area, a sensing time, a sensing count, and a sensing pressure of the grip input sensed through the grip sensor. For example, the controller 180 can generate a different control command by distinguishing a grip input sensed within a predetermined time and a grip input sensed for more than a predetermined time. Here, the grip input sensed within a predetermined time may be referred to as a short grip, and the grip input detected for more than a predetermined time may be referred to as a long grip.

In another example, the controller 180 can generate a different control command according to a grip input sensed at a first position and a user input sensed at a second position. In addition, the controller 180 can determine the user's posture currently holding the terminal based on at least one of the sensing position and the sensing area of the user input sensed through the grip sensor.

For example, the controller 180 can determine whether the user's hand is a right hand or a left hand based on at least one of the sensing position and the sensing area of the user input sensed through the grip sensor. In this instance, the controller 180 can generate a different control command according to the grip input applied by the left hand and the grip input applied by the right hand.

Hereinafter, the short grip input will be described as a grip input unless otherwise noted for the sake of convenience of explanation. In response to the sensing of the grip input, the controller 180 can perform a function related to a call function (S440). The function related to a call function include a recording function for recording the content of a current connected call, a bookmark function for adding a bookmark to a recording file in which the call content is recorded, a mute function for temporarily preventing a voice signal from being transmitted from a call party, a call switching function for switching a call party to another call party received when another call is received, or a group calling function for performing a group call when a plurality of different calls are received.

In addition, the function related to the call function may be a multitasking function for executing other functions other than the call function, a screen capture function for capturing screen information currently displayed on the touch screen, and the like. Here, the functions other than the call function may be various functions installed in the mobile terminal such as a web function for accessing an Internet web page, a schedule function for storing or notifying schedule information, a map function for providing map information, and the like.

In addition, the controller 180 can determine a function to be performed according to the grip input, based on whether or not the recording function is performed while performing the call function. For example, the controller 180 can execute the bookmark function based on the grip input being applied while a communication function and a recording function are being executed at the same time. In another example, the controller 180 can execute a recording function based on the grip input being applied while the recording function is not being executed while executing the call function.

Alternatively, the controller 180 can determine a function to be performed according to the grip input, based on whether or not another call signal is received while performing the call function. For example, the controller 180 can execute a recording function based on the grip input when no other call signal is received while performing the call function. In another example, the controller 180 can execute a call switching function based on the grip input when another call signal is received while performing the call function.

Alternatively, the controller 180 can determine a function to be performed according to the grip input, based on whether or not the user's ear adjacent to the main body is received while performing the call function. For example, the controller 180 can execute a recording function in response to the grip input being applied when the user's ear adjacent to the main body is sensed while performing the call function. For example, the controller 180 can execute a multitasking function in response to the grip input being applied when the user's ear adjacent to the main body is not sensed while performing the call function.

Though the above description has been made on the assumption of the call function, it should be understood that the present disclosure is not limited thereto. In other words, the present disclosure is applicable to a state in which any one external server is connected thereto for data communication.

Hereinafter, execution examples of call-related functions executed according to this control method will be described in detail with reference to the drawings. In particular, FIG. 5 is a conceptual view illustrating a method of executing a recording function during a call.

Referring to FIG. 5(a), the controller 180 can execute a call function. The controller 180 can turn off the touch screen 151 not to display visual information on the touch screen 151 when the user's ear adjacent to the main body is sensed through the proximity sensor 141. Alternatively, when the user's ear adjacent to the main body is not sensed through the proximity sensor 141, the controller 180 can display an execution screen of the call function on the touch screen 151 as shown in FIG. 5(a).

Referring to FIG. 5(b), the controller 180 can sense a grip input through the grip sensor while a call function is executed and the user's ear adjacent to the main body is sensed. In this instance, the controller 180 can execute a recording function in response to the grip input.

The recording function records voice information (i.e., call content) transmitted and received to and from a call party while performing a call function and generating a recording file. The recording function can record only the user's voice without recording the voice of the call party, or record the user's voice and the voice of the call party together according to the user's setting or the setting of the mobile terminal. Through this, the present disclosure can conveniently execute a recording function while listening to the content of a call without directly operating the touch screen for the execution of the recording function.

The controller 180 can record voice information transmitted and/or received to and/or from the call party after the recording function is executed. In addition, as shown in FIG. 5(b), the controller 180 can change the output color of an icon 510 indicating the recording function, and display a text message (RECORDING) 520 indicating that the recording function is being executed on the touch screen 151.

Meanwhile, as shown in FIG. 5(c), the controller 180 can end the recording function when a grip input is applied while the call function and the recording function are being executed at the same time. When the recording function is ended, the controller 180 generates a recording file through the recording function, and stores the generated recording file in the memory.

Furthermore, as shown in FIG. 5(c), the controller 180 can change the display color of the icon 510 indicating the recording function or display a text message (RECORDING END) 530 indicating that the recording function is ended on the touch screen 151. In addition, the controller 180 can automatically end the recording function when the call function is ended while the call function and the recording function are being executed together.

When the recording function is ended, the controller 180 can display notification information indicating that the recording file has been created on the status display bar. Here, the status display bar is located at an upper end portion of the touch screen 151, and is a bar-shaped graphic object that displays status information (remaining battery level, communication state, time, etc.) indicating the status of the mobile terminal. The status display bar can always be displayed at an upper end portion of the mobile terminal, unless otherwise specified. In addition, the controller 180 can display a status window providing summary information that summarizes the status information of the mobile terminal when a drag input is applied to the status display bar. A status window may be displayed in an entire region of the touch screen 151.

Further, the controller 180 can immediately execute a playback function for playing back a recording file or display a file list in which the recording file is stored based on a touch input being applied to notification information indicating that the recording file included in the status display bar has been created. Accordingly, the user can easily access the created recording file using the status display bar after the call is ended.

Figure 6A:
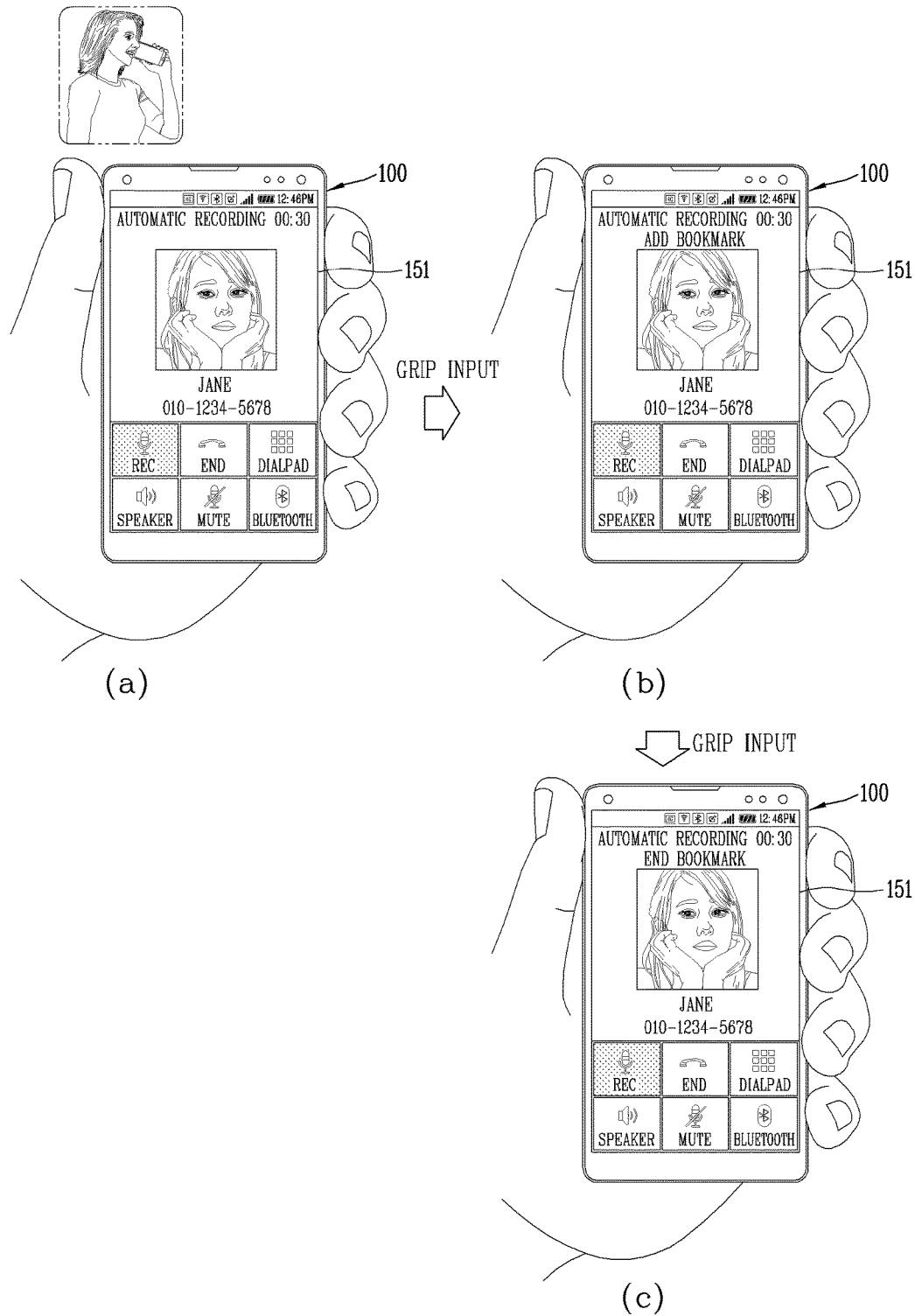
FIGS. 6A and 6B are conceptual views illustrating a state in which a bookmark function is executed when a call function and an automatic recording function are executed at the same time.
Figure 6B:
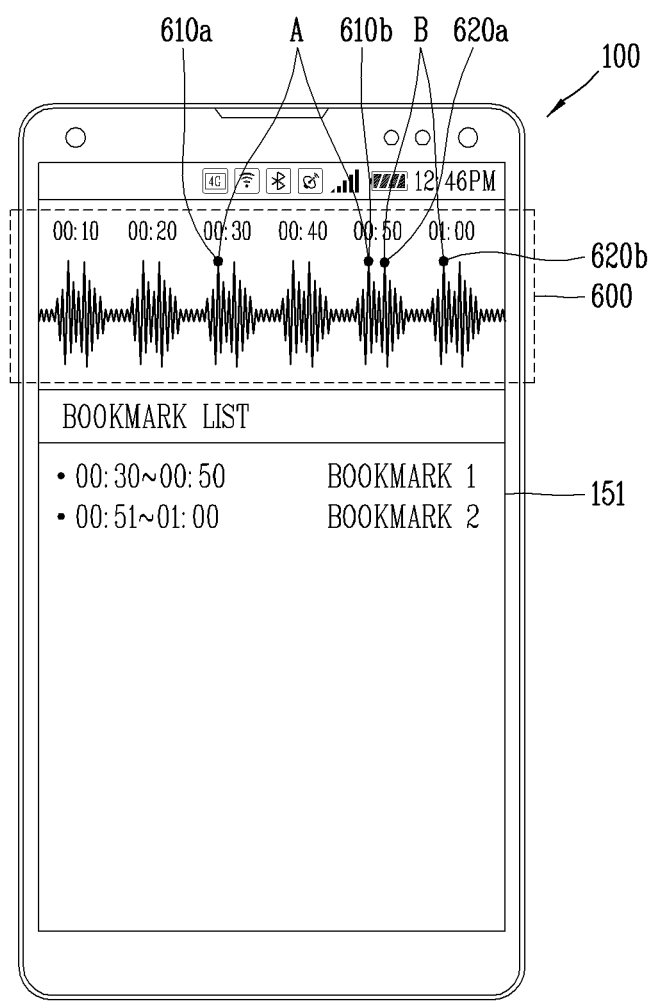

In the above, an embodiment in which the recording function is executed while performing a call has been described. Hereinafter, as an example of the control method shown in FIG. 4, an embodiment of executing a bookmark function when the call function and the automatic recording function are executed at the same time will be described. FIGS. 6A and 6B are conceptual views illustrating a state in which a bookmark function is executed when a call function and an automatic recording function are executed at the same time.

When the call function is executed in a normal call mode, the controller 180 can execute the automatic recording function at the same time. The automatic recording function is a function for executing a recording function simultaneously with the execution of a call function even when there is no user request to execute the recording function.

The controller 180 can execute a bookmark function based on a grip input being applied during the execution of the automatic recording function. When the bookmark function is executed, the controller 180 can create a recording file so that a bookmark is displayed at the time when the grip input is applied. The bookmark can be created in the form of an icon that allows a user to immediately access the time when the bookmark is displayed in the recorded file. Further, the bookmark function may be set to indicate a predetermined section of a recording file through a bookmark, or may be set to indicate a predetermined time point of a recording file through a bookmark.

When the bookmark function is set to indicate a predetermined section through a bookmark, the controller 180 can sets the execution time point of the bookmark function to a start point of the predetermined section, and the end time point at which the bookmark function is ended to an end point of the predetermined section.

For example, as shown in FIGS. 6A and 6B, the controller 180 can execute the bookmark function in response to a grip input being applied while the automatic recording function is being executed. In this instance, the controller 180 can set the execution time point of the bookmark function as a start point of a predetermined section and set a bookmark to be displayed at the relevant time point.

Besides, as shown in FIGS. 6B and 6C, the controller 180 can end the bookmark function when a grip input is applied again while the bookmark function is being executed. Furthermore, the controller 180 can set the end time point of the bookmark function as an end point of a predetermined section and set a bookmark to be displayed at the relevant time point.

For example, as shown in FIG. 6B, when a section between 00:30 and 00:50 (i.e., section A) is set as a predetermined section, the controller 180 can further display bookmarks 610a, 610b at the start and end points of the section A on a graphic object 600 indicating an entire playback section of the recording file.

Furthermore, through the same method as FIG. 6A, the controller 180 can set a plurality of bookmarked sections on one call recording file. For example, as shown in FIG. 6B, the controller 180 can set section A and section B (00:55·01: 00). In this instance, as shown in FIG. 6B, the controller 180 can display a bookmark list including items indicating bookmarked sections along with a graphic object indicating a recording file on the touch screen 151.

In addition, when a touch input is applied to any one of items indicating the bookmarked sections, the controller 180 can play back a section of a recording file corresponding to the item. Further, when a bookmark function is set to indicate a predetermined time point through a bookmark, the controller 180 can set a bookmark to be displayed on a recording file for every time point at which a grip input is applied.

For example, when a grip input is applied at 00:15, 00:30, and 00:50, the controller 180 can set a bookmark to be displayed on a recording file at each time point. The controller 180 can display bookmarks at positions corresponding to the respective time points on a graphic object indicating an entire section of the recording file. In this instance, the controller 180 can play back a recording file from any one of the time points in response to a touch input being applied to a bookmark indicating any one time point among the bookmarks indicating the respective time points.

In the above, a method of executing a bookmark function using a grip input while executing an automatic recording function has been described. Hereinafter, a method of executing a multitasking function while executing a call function will be described as an example of the control method shown in FIG. 4. In particular, FIGS. 7A and 7B are conceptual views illustrating a method of executing a multitasking function during a call.

Meanwhile, unlike the above description, the user can attempt to execute a specific function using the touch screen during the execution of a call function. In other words, as shown in (a) of FIG. 7A, the user can move the main body away from the user's face during the execution of the call function.

The controller 180 can sense whether or not the user is away from the main body through the proximity sensor 141. Specifically, the controller 180 can sense the user's ear adjacent to the main body through the proximity sensor 141. In this instance, the controller 180 can determine that the main body is located close to the user's face. On the contrary, when the user's ear adjacent to the main body is not sensed through the proximity sensor 141, the controller 180 can determine that the main body is located far away from the user's face.

The controller 180 can execute a speakerphone mode when a call function is being executed and the user's ear adjacent to the main body is not sensed. In other words, the controller 180 can switch from the normal call mode to the speakerphone mode. Accordingly, the user can perform a call to the call party even in a state in which the user is not adjacent to the main body (i.e., in a state of being located at a far distance). Further, switching to a speakerphone mode may be set automatically, or may be set when there is a user's request. It may vary depending on the setting of the mobile terminal.

The controller 180 can execute a multitasking function in response to a grip input being applied when the user's ear adjacent to the main body is not sensed while executing a call function. The multitasking function is a function for executing two or more applications at the same time. When a multitasking function is executed, the controller 180 can divide the display region of the touch screen into a plurality of regions to display an execution screen of a different application for each region. For example, as shown in (b) of FIG. 7A, when a multitasking function is executed, the controller 180 can divide the display region of the touch screen 151 into two regions (first region and second region).

At this time, the controller 180 can display an execution screen 700 of a call function on the first region and display screen information related to a recommendation function on the second region.

The recommendation function may be a function related to the content of a call, a function being executed in the background, a function frequently executed together with a call function, and a function set to be executed together during the execution of multitasking. The function related to the content of a call may be determined by the controller 180. Specifically, the controller 180 can analyze the content of the call and generate the context information of the call content.

Then, the controller 180 can extract at least one application from applications installed in the mobile terminal, based on the context information of the call content. For example, the controller 180 can extract a map application when the context information of the call content is information related to a specific location.

The function being executed in the background is a function currently being executed, but in which the execution screen is not displayed on the touch screen 151. Further, the function frequently executed together with a call function may be extracted from a use pattern of the mobile terminal. For example, when a call function and a web function are frequently executed together, the controller 180 can set a frequently executed function together with the call function to a web function.

The function set to be executed together during the execution of multitasking is a function preset by the user. When a plurality of recommendation functions are provided, the controller 180 can display a plurality of thumbnail views corresponding to the execution screens of the plurality of recommendation functions, respectively, in the second region. The thumbnail view is an image obtained by converting the execution screen into a small size. Thumbnail views may be respectively set to a function of immediately entering an execution screen indicated by each.

The controller 180 can determine the sort order of the plurality of thumbnail views based on the execution count of the plurality of recommendation functions or the context information of the call content. Specifically, the controller 180 can sequentially display the thumbnail views in a form in which the thumbnail views are stacked in the order of the execution counts among the plurality of recommendation functions. For example, as shown in FIGS. 7A and 7B, the controller 180 can sequentially display the thumbnail views of a messenger application, a gallery application, and a web application in the second region in the order of execution counts.

Alternatively, the controller 180 can sequentially display the thumbnail views corresponding to the plurality of recommendation functions in the order in which the call content has high relevance to the context information. The relevance may be determined by the controller 180 through a preset algorithm. For example, as shown in (a) and (b) of FIG. 7B, the controller 180 can sequentially display the thumbnail views of a map application, a web application, and an schedule application in the order in which the call content has high relevance to the context information (Where is oo restaurant located?) on the second region. Through this, the user can more quickly enter an application most frequently used during the call or an application having the highest relevance to the context of the call content.

Further, although not shown, the controller 180 can display a standby screen on the second region. The standby screen may display a home screen page, an app list page, and the like. Alternatively, the controller 180 can display an execution screen of a preset application on the second region. Visual information that is displayable on the second region may be set in various ways by the user.

In addition, although not shown, the controller 180 can end a multitasking function in response to a grip input being applied again when the multitasking function is being executed. In this instance, only an execution screen of a call function may be displayed on the touch screen 151.

In the above, a method of performing multitasking during a call has been described. Hereinafter, a method of performing a mute function during a call will be described as an example of the control method shown in FIG. 4. In particular, FIG. 8 is a conceptual view illustrating a method of executing a mute function during a call.

The controller 180 can perform a mute function in response to a grip input being applied while performing a call function. The mute function is a function for preventing voice information uttered by the user from being transmitted to the call party.

When the user's ear adjacent to the main body is sensed through the proximity sensor 141, the controller 180 can perform a call function in a normal call mode. The controller 180 can perform a mute function in response to a grip input being applied in a normal call mode. In this instance, the display color of an icon 810 indicating the mute function may be changed on the touch screen 151 as shown in FIGS. 8(*a*) and 8(*b*).

Furthermore, the controller 180 can execute a voice recognition function together with the execution of the mute function through a grip input. In this instance, the controller 180 can control the operation of the mobile terminal based on the user's voice command. For example, when the user receives a voice command "when oo restaurant is reserved?" during execution of a mute function, the controller 180 can output a voice message of "oo day has been reserved" in response to the voice command. Accordingly, the present disclosure allows a user to easily search for related information during a call through a voice without directly manipulating the touch screen. Whether or not to execute the voice recognition function can be determined by the setting of the terminal or a user request.

Further, in the present disclosure, the mute function can be performed in the same manner not only in a normal call mode but also in a speakerphone mode. When the user's ear adjacent to the main body is not sensed through the proximity sensor 141, the controller 180 can perform a call function in a speakerphone mode. The controller 180 can perform a mute function in response to a grip input being applied in a speakerphone mode.

Moreover, when the mute function and the voice recognition function are executed at the same time, the controller 180 can display an execution screen of the call function and an execution screen of the voice recognition function on the touch screen 151 together. Accordingly, the user can be provided with visual information through the touch screen 151 when the view of the touch screen 151 is secured.

Figure 9B:
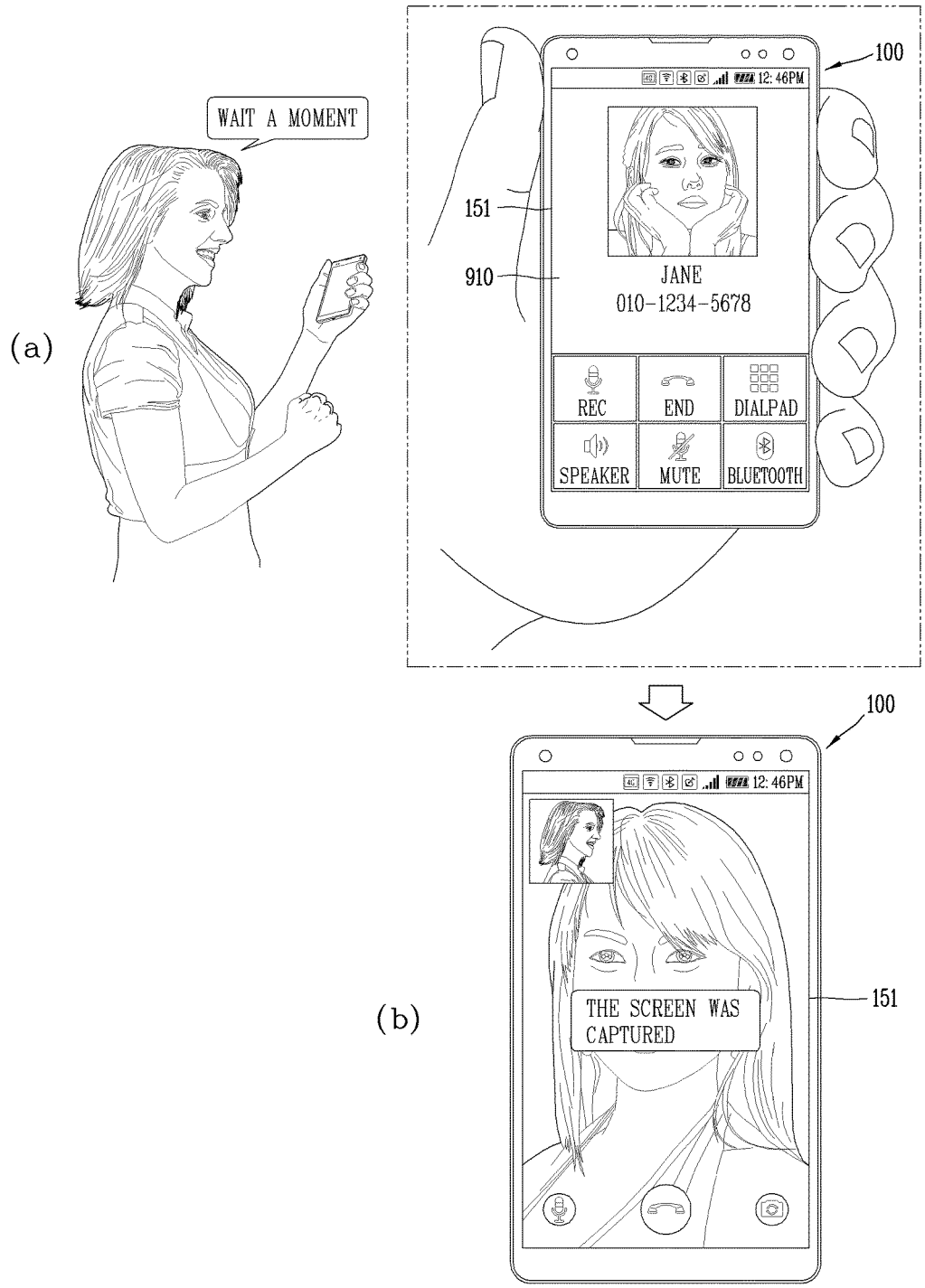

In the above, a method of performing a mute function during a call has been described. Hereinafter, a method of executing a multitasking function or a screen capture function during a video call will be described as an example of the control method shown in FIG. 4. In particular, FIGS. 9A and 9B are conceptual views illustrating a method of executing a multi-tasking function or a screen capture function during a video call.

The controller 180 of the mobile terminal according to the present disclosure can execute a video call function of transmitting and receiving a video signal and a voice signal together to and from the call party. For example, as shown in (a) of FIG. 9A, when the video call function is executed, the controller 180 can display video information 910 received from the call party and video information 900 transmitted to the call party may be displayed together on the touch screen 151. In addition, the controller 180 can also transmit and receive a voice signal to and from the call party while video information is displayed on the touch screen.

As shown in (b) of FIG. 9A, when a grip input is sensed while executing the video call function, the controller 180 can execute a multitasking function. The controller 180 can divide the touch screen 151 into a first region and a second region in response to a grip input, and display an execution screen 900, 910 of a video call function on the first region, and screen information 920 related to a recommendation function on the second region. The detailed description of the screen information related to a recommendation function is the same as that of FIGS. 7A and 7B, and will be substituted by the description of FIGS. 7A and 7B.

Alternatively, the controller 180 can execute a screen capture function when a grip input is sensed during execution of the video call function. The screen capturing function is a function of capturing screen information currently displayed on the touch screen 151. As shown in FIGS. 9A and 9B, the controller 180 can execute a screen capture function in response to the sensing of a grip input during the execution of the video call function. Accordingly, when the user wants to instantaneously capture the information of the screen information currently displayed during the video call, the screen capture function can be conveniently performed without complicated steps for executing the screen capture function.

Whether or not to execute a multitasking function or a screen capture function as a function to be executed through the grip input may be preset at the factory shipment of the mobile terminal or may be set by the user's request. Alternatively, the controller 180 can execute a multitasking function or a screen capturing function with a different type of grip input. For example, the controller 180 can execute a screen capture function when a short grip is input, and execute a multitasking function when a long grip is input during the execution of a video call function. As described above, the type of the grip input may vary depending on a number of grips, a grip time, a grip area, and the like.

In the above, a method of executing a multitasking function or a screen capture function during the execution of a video call function has been described. Hereinafter, a method of executing a call switching function during a call will be described as an example of the control method shown in FIG. 4. In particular, FIG. 10 is a conceptual view illustrating a state in which a call switching function during a call is executed.

As shown in FIG. 10(a), the controller 180 can receive a new call signal from the terminal of the call party during the execution of the call function. In this instance, the controller 180 can output notification information indicating that the new call signal has been received. For example, the notification information can be output as a bell sound, a voice signal, a vibration, or the like.

In addition, the controller 180 can connect a call signal received from the terminal of another party different from the call party in response to a long grip input being applied while receiving a new call signal. When connected to a new call signal, the controller 180 can perform a call to a new call party that has transmitted the new call signal.

Furthermore, the controller 180 can set a call signal received from the previously connected terminal of the call party to a standby state. The standby state is set not to transmit and receive a voice signal to and from the terminal of the other party while maintaining the connection of the call signal.

When a long grip input is applied again while performing a call to a new call party, the controller 180 can perform a call again to the other part previously set in the standby state. In this instance, the call to the new party may be set to the standby state, or the call signal connection may be ended.

In addition, the controller 180 can execute a call switching function or a call reject function according to the type of the grip input. For example, as described above, the controller 180 can execute a call switching function for switching the call party when a long grip input is applied, and execute a call reject function for rejecting a new call signal connection when a short grip input is applied.

In the above, a method of executing the call switching function when a new call signal is transmitted during a call has been described. Through this, the present disclosure enables a new call signal connection without checking the touch screen while performing a call. Hereinafter, a method of executing a group function will be described as an example of the control method shown in FIG. 4. In particular, FIG. 11 is a conceptual view illustrating a method of executing a group call function.

As shown in FIG. 11(a), the controller 180 can execute a group call function (conference call) for performing communication with a plurality of external terminals. In this instance, the controller 180 can receive voice signals from a plurality of external terminals and transmit voice signals to a plurality of external terminals.

When a grip input is sensed during the execution of a group call function, the controller 180 can set a specific terminal among the plurality of external terminals to a standby state. The standby state will be substituted by the description of the standby state in FIG. 10. For example, as shown in FIG. 11(b), the controller 180 can set the terminal B to a standby state when a grip input is sensed during the execution of a group call function with A and B. In this instance, the controller 180 can set a voice signal to be transmitted and received only to some terminals, such as a whisper message, even during a group call. This function can be called a whisper call function.

Furthermore, the controller 180 can release the standby state of the terminal B and set the terminal B to be communicable again when a grip input is applied again while the terminal B is set to the standby state. When a touch input to a graphic object corresponding to a specific party is sensed and then a grip input is sensed while a graphic object corresponding to call parties performing a group call is displayed on the touch screen 151, the controller 180 can set the terminal of the specific party to a standby state. In other words, the controller 180 can directly set a call party to be set to the standby state based on the user's touch input.

In the above description, a method of applying a grip input during the execution of a group call function to execute a whisper call function has been described. The mobile terminal according to the present disclosure can execute a call-related function during the call using a grip sensor, thereby more conveniently executing the call-related function while maintaining the continuity of the call. In addition, the mobile terminal according to the present disclosure can execute a call-related function according to the state of the mobile terminal during the call, thereby executing a call-related function suitable for a situation.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. A mobile terminal, comprising:
   a main body;
   a wireless communication unit configured to transmit and receive a call signal and a voice signal to and from an external terminal;
   a grip sensor disposed on a side surface of the main body and configured to sense an external force applied to the side surface; and
   a controller configured to:
   execute a call function with an external terminal, and
   execute a recording function of recording a voice signal related to the call function when a grip input is sensed through the grip sensor and a user's ear or a user's face adjacent to the main body is sensed during the execution of the call function.

2. The mobile terminal of claim 1, further comprising:
   a proximity sensor configured to sense the user's a user's ear adjacent to the main body,
   wherein when the grip input is sensed during the execution of the call function, the controller is further configured to execute a first function when the user's ear adjacent to the main body is sensed and execute a second function when the user's ear adjacent to the main is not sensed.

3. The mobile terminal of claim 2, further comprising:
   a touch screen disposed on a front surface of the main body,
   wherein the controller is further configured to:
   execute a speakerphone mode when the user's ear adjacent to the main body is not sensed during the execution of the call function, and
   execute a multitasking function of dividing a display region of the touch screen into a plurality of regions and display an execution screen of a different application for each region in response to the grip input being sensed during the execution of the speakerphone mode.

4. The mobile terminal of claim 3, wherein the controller is further configured to:
   display an execution screen of the call function in a first region of the divided plurality of regions, and
   display screen information related to a recommendation function in a second region of the plurality of divided regions.

5. The mobile terminal of claim 4, wherein the recommendation function includes at least one among a function related to call content, a function being executed in the background, and a function frequently executed together with a call function.

6. The mobile terminal of claim 5, wherein the recommendation function includes a plurality of the recommendation functions, and
   wherein the controller is further configured to display a plurality of thumbnail views corresponding to the execution screens of the plurality of recommendation functions, respectively, in the second region.

7. The mobile terminal of claim 6, wherein the controller is further configured to determine a sort order of the plurality of thumbnail views based on either one of an execution count of the plurality of recommendation functions and context information of the call content.

8. The mobile terminal of claim 3, wherein the controller is further configured to end the multitasking function in response to another grip input being applied again during the execution of the multitasking function.

9. The mobile terminal of claim 3, wherein when a gesture of switching a state in which the user's ear adjacent to the main body is not sensed to a state in which the user's ear adjacent to the main body is sensed during the execution of the speakerphone mode and the multitasking function, the controller is further configured to end the speakerphone mode and the multitasking function.

10. The mobile terminal of claim 2, wherein the controller is further configured to:
    execute a multitasking function of displaying an execution screen information of a plurality of functions together in response to the grip input being applied when the user's ear adjacent to the main body is not sensed during the execution of the call function.

11. The mobile terminal of claim 1, wherein when the recording function is executed simultaneously with the execution of the call function, the controller is further configured to display a recording file on a touch screen of the mobile terminal including at least one bookmark indicating a time point at which at least one grip input is applied in response to the at least one grip input being applied during the execution of the recording function.

12. The mobile terminal of claim 1, further comprising:
    a touch screen disposed on a front surface of the main body,
    wherein when a video call function with the external terminal is executed, the controller is further configured to display video information corresponding to the video call function on the touch screen, and execute a multitasking function in response to the grip input being sensed while displaying video information on the touch screen.

13. The mobile terminal of claim 12, wherein the controller is further configured to:
    execute a screen capture function in response to a short grip input being sensed while displaying the video information on the touch screen, and
    execute a multitasking function in response to a long grip input being sensed while display the video information on the touch screen.

14. The mobile terminal of claim 1, wherein when a call signal is received from a new external terminal during the execution of the call function, the controller is further configured to switch the new external terminal to a party of the call function in response to the sensing of the grip input that lasts for more than a preset period of time.

15. The mobile terminal of claim 14, wherein when the call party is switched to the new external terminal, the controller is further configured to stop outputting a voice signal received from the external terminal.

16. The mobile terminal of claim 1, wherein the controller is further configured to:
  execute a group call function with a plurality of external terminals, and
  output only a voice signal received from one of the plurality of external terminals in response to the grip input being sensed for more than a preset period of time during the execution of the group call function.

17. A method of controlling a mobile terminal, the method comprising:
  executing, via a controller of the mobile terminal, a call function with an external terminal;
  sensing, via a proximity sensor of the mobile terminal, a user's ear or a user's face adjacent to a main body of the mobile terminal;
  sensing, via a grip sensor of the mobile terminal, a grip input corresponding to an external force applied to a side surface of the main body while the user's ear or the user's face adjacent to the main body is sensed; and
  executing, via the controller, a recording function for recording voice information corresponding to a voice signal in the executing call function in response to the grip input.

18. The method of claim 17, further comprising:
  executing a multitasking function when the grip input is sensed while the user's ear adjacent to the main body is not sensed.

19. The method of claim 18, wherein the executing the multitasking function further comprises:
  dividing a display region of a touch screen of the mobile terminal into a plurality of regions; and
  displaying an execution screen of the call function in any one of the plurality of regions and displaying an execution screen of a recommendation function in another region, and
  wherein the recommendation function includes at least one function among a function related to call content, a function being executed in the background, and a function frequently executed together with a call function.

20. The control method of claim 17, further comprising:
  executing a multitasking function in response to the grip input being applied during the execution of the video call function,
  wherein the call function is a video call function for transmitting and receiving a video signal and a voice signal together.

* * * * *